UNITED STATES PATENT OFFICE.

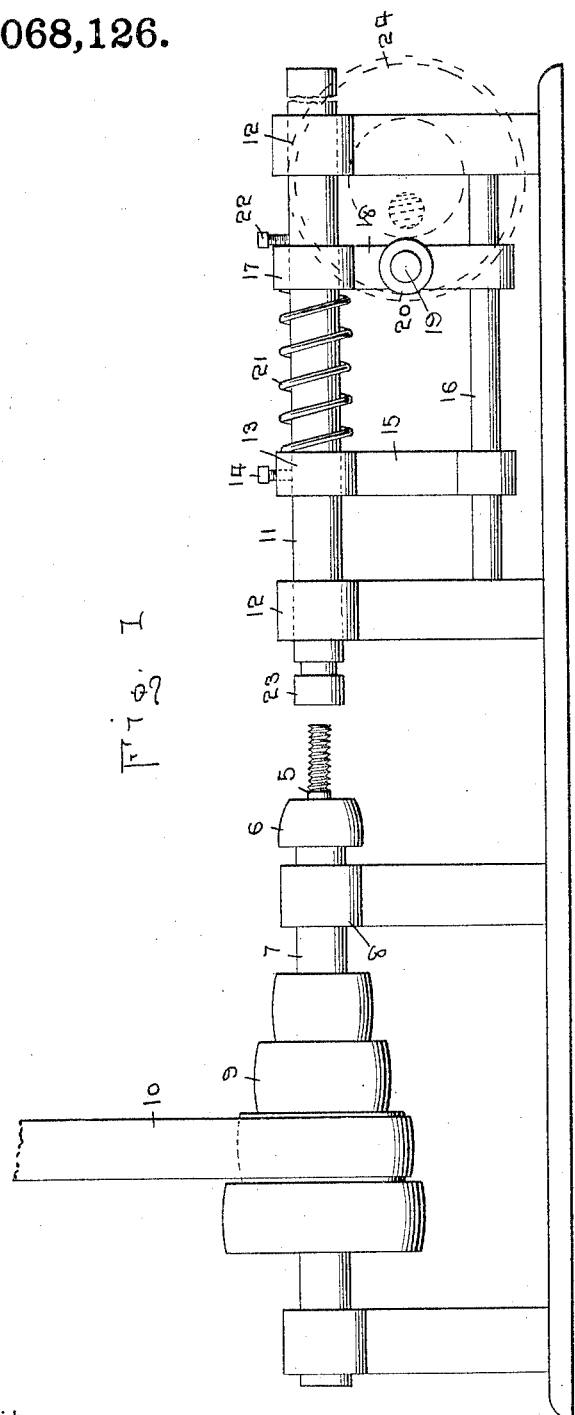
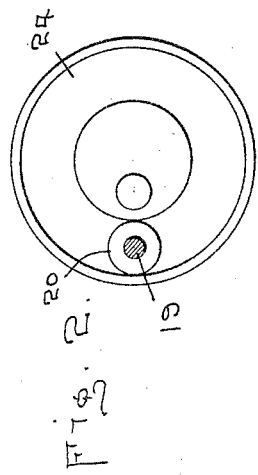

LAURENCE C. HAMILTON AND JOSEPH A. HENDRICKS, OF FLINT, MICHIGAN.

SCREW-THREADING MACHINE.

1,068,126.

Specification of Letters Patent.

Patented July 22, 1913.

Application filed February 18, 1913. Serial No. 749,228.

*To all whom it may concern:*

Be it known that we, LAURENCE C. HAMILTON and JOSEPH A. HENDRICKS, citizens of the United States, residing at Flint, in the county of Genesee and State of Michigan, have invented certain new and useful Improvements in Screw-Threading Machines; and we do hereby declare the following to be a full, clear, and exact description of the invention, such as will enable others skilled in the art to which it appertains to make and use the same.

This invention relates to screw-threading machines, and it more particularly relates to an improved tension-feed mechanism for regulating the pressure of the die upon the stud or screw which is being threaded.

When threading a stud or screw with a machine in which the ordinary force-feed is employed for moving the die longitudinally of the screw or stud, it is essential that the longitudinal movement of the shaft which carries the die is commensurate with the pitch of the screw-thread to be cut. If the longitudinal movement is greater or less, or if the rotary movement of the screw becomes greater or less than is commensurate, then the threads will either be marred or demolished; therefore, many of the screws are imperfect and many others are rendered entirely worthless because of some of the numerous defects or inaccuracies which result from the slipping of belts, inaccurate adjustment, lost motion, and many other things which are likely to occur and affect the relative speeds which are essential in the production of perfect screw threads, and therefore,—an object of the invention is to provide an improved and simplified mechanism of this character whereby a single force-feed member may be employed in lieu of the large number of force-feed devices which have heretofore been found necessary in accomplishing the same general result that is accomplished by this invention.

Another object of the invention is to provide a device of this character which obviates and avoids the unsatisfactory results which attend other screw-threading machines when certain parts thereof become worn, or when the belts or other transmission gears slip or otherwise operate imperfectly.

Another object of the invention is to provide a mechanism of this character which may be quickly and easily adjusted, for regulating the tension, preparatory to cutting screws of different sizes and of different materials.

Other objects and advantages may be recited hereinafter and in the claims.

In the accompanying drawings which supplement this specification, Figure 1 is a side elevation view of our improved tension-feed mechanism, and, Fig. 2 is a detail view of a cam which may be used in connection with the mechanism shown in Fig. 1.

Referring to these drawings, in which similar reference characters indicate the same parts throughout the several views, the stud or screw 5 is held by the usual or any preferred form of chuck 6, carried by a spindle 7, which is rotatable within the bar 8 and adapted to be actuated by means of a cone pulley 9 and a belt 10, or by other proper means. A reciprocatory shaft 11 is slidably seated in the bearings 12. A collar 13 is adjustably seated on the shaft 11 by means of a set-screw 14. The collar or spring seat element 13 has a depending extension or arm 15 which is slidably engaged with a guide bar 16, carried by the posts which support the bearings 12; so that the shaft 11 may be moved longitudinally with relation to the shaft 16 but may not be rotated. A collar 17 is slidably seated on the shaft 11 and has a depending arm 18 which is slidably engaged with the shaft 16. A stud or pivot 19 extends laterally from the arm 18 and has a roller 20 journaled thereon.

A spring 21 is seated on the shaft 11 and bears against the collars 13 and 17, so as to separate said collars and exert a tension which tends to separate them when they are forced into proximity. A screw or stud 22 is secured to the shaft 11 and coacts with the stud 14 and collars 13 and 17 for pressing the spring between said collars and for limiting the space which separates the collars. An ordinary screw-threading die is carried by the shaft 11, as indicated at 23. The die 23 is removably secured to the shaft 11, and may be replaced by another die when another screw or stud of a different size or different pitch is to be threaded. A cam 24 engages with the roller 20, and this cam may be rotated by any proper means, so as to reciprocate the shaft 11, through the medium of the members 13, 21, 17, 18, 19 and 20.

In operation, the die 23 is carried forward against the stud 5, as described, and the relative speeds are regulated so that the spindle 11 is carried forward at a slightly higher speed than it would be carried by the rotation of the threads, if said threads constituted the transmission means of the shaft, therefore, the forward or leftward movement of the shaft 11 is slightly retarded by its contact with the stud 5, while the cam 24 continues to positively force the arm 18 and collar 17 forward. It will be seen that this will result in compressing the spring 21, and thereby exerting a tension upon the shaft 11 which is sufficient to cause the die 23 to take hold of the stud and cut the thread thereof, but is not sufficient to feed the die upon the threads with undue rapidity, and thereby mar or demolish the threads, as sometimes occurs with screw-threading machines having a force-feed only.

When a screw of greater pitch is to be threaded, the collar 13 may be adjusted on the shaft 11 so as to diminish the distance between the collars 13 and 17, and thereby increase the tension of the spring 21.

While we have shown a cam of ordinary construction for reciprocating the shaft 11, it is to be understood that we may employ any cam of ordinary and suitable construction, and while we do not contemplate using a single cam for all of the different sizes of screws that may be cut upon this machine, we greatly reduce the number of cams which are necessary. For instance, we may employ one cam for cutting all threads from 14 to 24 pitch, and replace this cam with one of a larger size for cutting all threads from 24 to 34, where the screws are longer.

By means of this improved tension-feed mechanism, we not only improve the quality of the screws, but we greatly increase the quantity, or number produced, by effecting a great saving of time in eliminating the defects which have hitherto attended this portion of the former machine, which was the same in all respects as the one here illustrated, except that the resilient tensioning device was absent. By the present improvement we have increased our output from 8,000 to 14,000 screws per day. Therefore, it will be seen that we have provided a mechanism of this character which is fully capable of attaining the foregoing objects, in a thoroughly practical and efficient manner.

We do not limit our invention to the exact details of construction, combination and arrangement of parts, as herewith illustrated and described, but our invention may only be limited by a reasonable interpretation of the claims.

We claim:—

1. In combination, a screw-cutting die, a reciprocatable shaft carrying the die, a collar adjustably secured on the shaft, a second collar slidably secured on the shaft, a compressible spring on the shaft between the collars, and means for sliding the second collar on the shaft against the action of said spring to exert a yielding pressure upon the member to be screw threaded.

2. In combination, a screw-cutting die, a reciprocatable shaft, a collar adjustably secured on the shaft and having an arm extending therefrom, a guide bar parallel with said shaft and being slidably engaged with said arm, a second collar slidably seated on the shaft and having an arm extending therefrom and in slidable engagement with said guide bar, a spring compressed between the collars, and means coacting with the second said arm for sliding the second said collar on said shaft against the action of said spring and coacting therewith for sliding said shaft and causing said die to exert a yielding pressure upon a member to be screw-threaded.

In testimony whereof we have signed our names to this specification in the presence of two subscribing witnesses.

LAURENCE C. HAMILTON.
JOSEPH A. HENDRICKS.

Witnesses:
HOMER J. McBRIDE,
JOHN F. BAKER.

---

Copies of this patent may be obtained for five cents each, by addressing the "Commissioner of Patents, Washington, D. C."